United States Patent [19]

Erich, Jr. et al.

[11] Patent Number: 4,813,029

[45] Date of Patent: Mar. 14, 1989

[54] GEOPHONE APPARATUS AND A SEISMIC EXPLORATION METHOD

[75] Inventors: Otis G. Erich, Jr., La Mirada; Walter R. Fillippone, Placentia, both of Calif.

[73] Assignee: Union Oil Company of California, Los Angeles, Calif.

[21] Appl. No.: 290,413

[22] Filed: Aug. 5, 1981

[51] Int. Cl.$^4$ .............................................. G01V 1/18
[52] U.S. Cl. ..................................... 367/188; 181/401; 367/75
[58] Field of Search ............... 367/188, 165, 75, 153, 367/155, 157, 25, 72; 73/644, 654, 658, 649; 340/566; 181/113, 401

[56] References Cited

U.S. PATENT DOCUMENTS

| 2,740,945 | 4/1956 | Howes | 367/25 |
|---|---|---|---|
| 3,509,636 | 5/1970 | Hansen | 73/654 |
| 4,059,820 | 10/1977 | Turpening | 367/75 |
| 4,219,096 | 8/1980 | Airhart | 181/113 |
| 4,280,200 | 7/1981 | Silverman | 367/75 |
| 4,300,220 | 11/1981 | Goff et al. | 367/188 |
| 4,312,052 | 1/1982 | Vogel et al. | 367/75 |
| 4,321,981 | 3/1982 | Waters | 367/75 |

FOREIGN PATENT DOCUMENTS 2446494   9/1980   France ........................... 367/188

*Primary Examiner*—Thomas H. Tarcza
*Assistant Examiner*—I. Lobo
*Attorney, Agent, or Firm*—Alan H. Thompson; Gregory F. Wirzbicki

[57] ABSTRACT

A geophone apparatus capable of detecting both horizontal shear and compressional seismic waves has a pair of geophones mounted such that, when in use, said geophones will be inclined at an angle of about 45° in opposite directions from vertical. The output signals generated by the two geophones are summed to yield a compressional wave trace and/or are subtracted one from the other to yield a horizontal shear wave trace.

19 Claims, 1 Drawing Sheet

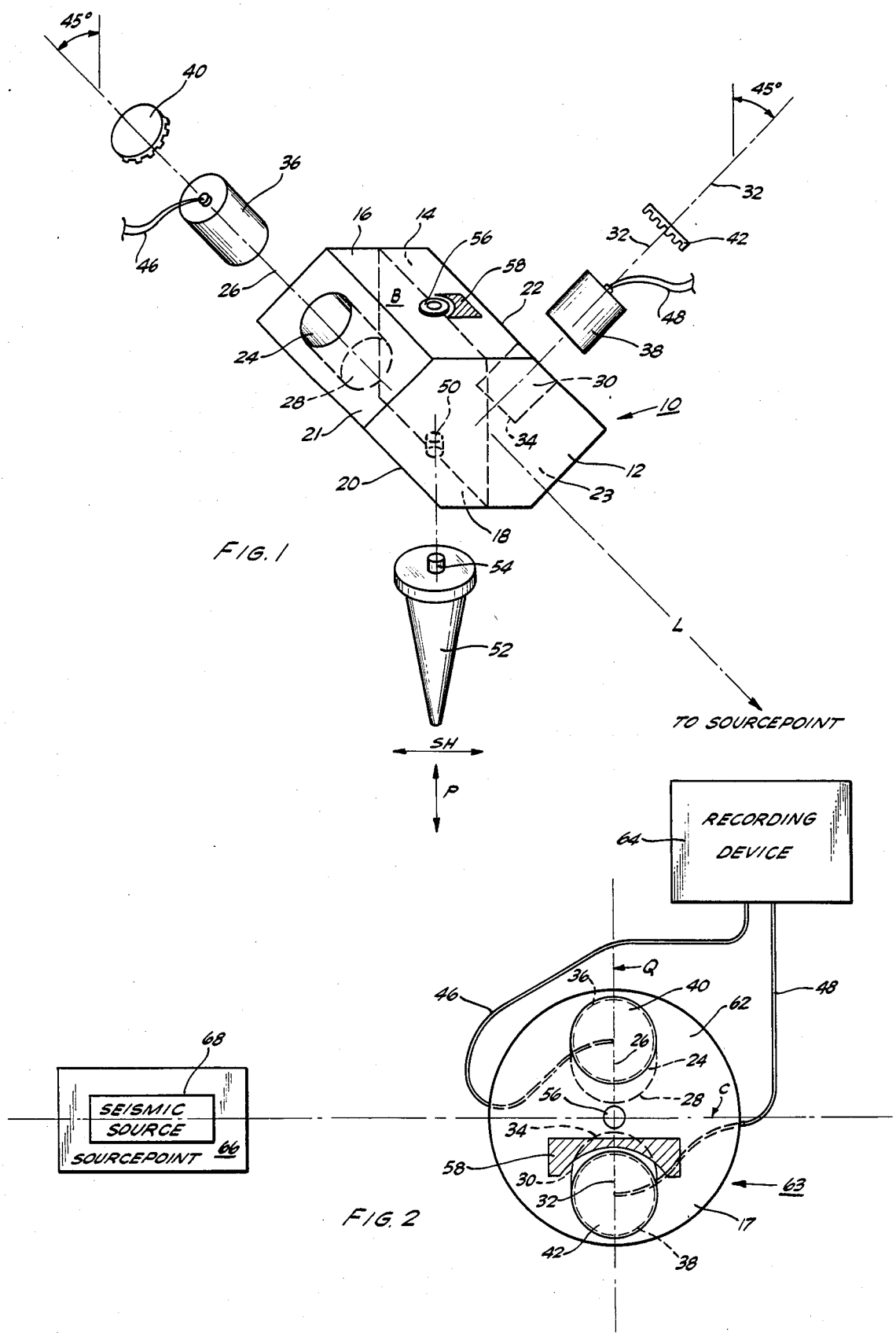

GEOPHONE APPARATUS AND A SEISMIC EXPLORATION METHOD

BACKGROUND OF THE INVENTION

1. Field of the Invention

The present invention relates to apparatus for the detection of seismic waves using geophones as well as to methods for recording and processing the waves detected thereby, and more particularly relates to apparatus capable of detecting both shear and compressional seismic waves and to methods for obtaining shear and compressional seismic wave traces using such apparatus.

2. Description of the Prior Art

In the search for petroleum and other valuable resources, it has become the practice to transmit a seismic signal into the earth from one or more sourcepoints near the surface of the earth. The reflected and/or refracted energy returning from within the earth to a receiver location is detected by a geophone or other seismometer and raw seismic data is recorded. The raw seismic data is mathematically processed and then interpreted to provide an indication of the structure of the underlying strata.

Geophones that detect the reflected seismic signals are generally electromagnetic devices that contain at least one coil representing the electric circuit and at least one magnet which cooperates with the coil. Either the coil or the magnet is rigidly connected to a frame, while the other is elastically suspended from the frame. In response to earth motion, all of the fixed elements of the geophone move with the frame, but the suspended element, under the influence of inertia, tends to be delayed with respect to the unsuspended element, creating relative movement between the coil and magnet. This movement induces an electrical current in the coil which comprises the output signal of the geophone. In any of these geophones, there exists a primary axis, such as a horizontal axis or a vertical axis, along which the suspended element is free to reciprocate, thereby giving rise to the electrical output signal.

Geophones have been used to detect different types of generated seismic signals during seismic exploration of earth strata. The most common type is the so-called compressional (P) wave in which the earth particle motion is in the same direction as the wave propagation. Compressional waves are also sometimes called longitudinal waves. The other type is the shear wave in which the earth particle motion is normal to the direction of wave propagation. Shear waves in which the particle motion is oriented normal to the incident plane are called horizontal shear (SH) waves and shear waves in which the particle motion is oriented within the incident plane are called vertical shear (SV) waves.

Compressional waves are the signals most commonly used for seismic exploration. Compressional waves may be generated in numerous ways, such as the detonation of an explosive, the dropping of weights or the use of mechanical vibrators, and compressional waves are usually detected by so-called vertical geophones designed and manufactured with a vertical primary axis for detecting vertical earth movement. Recently, however, there has been an increased interest in the use of shear waves in seismic exploration. U.S. Pat. Nos. 3,286,783 to Cherry et al., 3,302,164 to Water et al., 3,372,770 to Clynch, 3,835,954 to Layotte, 3,736,556 to Barr, Jr , and 4,059,820 to Turpening disclose various apparatus and methods for the generation, detection, and use of shear waves in seismic exploration. Horizontal shear waves have generally been detected using horizontal geophones.

It has been proposed to use a combination of a vertical geophone and one or more horizontal geophones mounted on a common baseplate or a plurality of closely grouped base plates. However, a need exists for alternatives to such geophone apparatus which result in greater accentuation of the desired signal components, i.e., either the compressional wave components or the horizontal shear wave components, and greater attenuation of the undesired components.

Accordingly, it is a primary object of this invention to provide a geophone apparatus capable of detecting both horizontal shear and compressional seismic waves, the use of which apparatus will result in the production of seismic traces with improved quality.

Another object of this invention is to provide a geophone apparatus capable of detecting both horizontal shear and compressional seismic waves and which is fully compatible with the other apparatus conventionally employed in seismic exploration.

A further object of this invention is to provide a seismic exploration method for concurrently detecting both horizontal shear and compressional seismic waves and for processing the data obtained to produce a compressional wave trace and, optionally, a horizontal shear wave trace of improved quality.

Other objects, advantages and features of this invention will become apparent to those skilled in the art from the following description when taken in conjunction with the drawings.

SUMMARY OF THE INVENTION

Briefly, the invention provides a geophone apparatus capable of detecting both compressional and horizontal shear waves and a seismic exploration method using this apparatus. The apparatus includes first and second geophones mounted on a common baseplate such that, when positioned for use, the axes of the geophones are inclined in opposite directions at an angle of about 45° from vertical. In preferred embodiments of the apparatus of this invention, the axes of the geophones are located in the same vertical plane, or in parallel vertical planes, which is (are) substantially perpendicular to a line from the sourcepoint to the receiver locations. Each geophone of the apparatus detects both compressional and shear waves transmitted to the baseplate and each geophone generates an output signal proportional to the seismic energy detected by it.

In the method of this invention, the two output signals from the novel geophone apparatus are summed to yield a seismic compressional wave trace and/or one output signal is subtracted from the other to yield a seismic shear wave trace. The summing to produce the compressional wave trace serves to accentuate the desired compressional components of the two output signals from the geophone apparatus while attenuating the unwanted horizontal shear wave components. Conversely, the subtraction of the output signals to produce the horizontal shear wave trace serves to accentuate the horizontal shear wave components while attenuating the unwanted compressional wave components.

BRIEF DESCRIPTION OF THE DRAWINGS

The invention will be more readily understood by reference to the accompanying drawings, wherein like numerals refer to like elements, and in which:

FIG. 1 is an exploded isometric view of one embodiment of the geophone apparatus of this invention; and FIG. 2 is a plan view of the earth surface upon which are positioned a seismic source, a recording device and another embodiment of the geophone apparatus of this invention.

DETAILED DESCRIPTION OF THE INVENTION

Since the particle motions involved in compressional (P) waves and in vertical shear (SV) waves occur in the same vertical plane, a geophone apparatus detecting one will always detect the other and the data processing techniques involved in the method of this invention will either accentuate both P and SV components or attenuate both P and SV components of the geophone output signals being processed. Thus, wherever in this application mention is made of compressional wave components or compressional wave traces, it will be understood by those skilled in the art that the components or traces being described also contain vertical shear wave data.

FIG. 1 illustrates an embodiment of the geophone apparatus of this invention which has a baseplate, shown generally as 10, having hexagonal front face 12, hexagonal rear face 14, rectangular top face 16, rectangular bottom face 18 and rectangular side faces 20, 21, 22 and 23. Cylindrical cavity 24 opens through side face 21, extends downwardly from side face 21 through baseplate 10 along axis 26, and terminates at cavity bottom 28. Similarly, cylindrical cavity 30 opens through side face 22, extends downwardly from side face 22 through base plate 10 along axis 32, and terminates at cavity bottom 34. Axes 26 and 32 are each inclined at a 45° angle from a plane, indicated as plane B, extending longitudinally through baseplate 10 from front face 12 to rear face 14. As illustrated, cavities 24 and 30 are preferably at different distances from front face 12 such that they do not overlap. Alternatively, on a baseplate of sufficient size, cavities 24 and 30 may be positioned such that axes 26 and 32 are each coincident with a plane, not shown, extending through baseplate 10 perpendicular to plane B and parallel to front face 12 and rear face 14.

The geophone apparatus also includes geophone 36 adapted to be coaxially mounted in cylindrical cavity 24, and geophone 38 adapted to be coaxially mounted in cylindrical cavity 30. Optionally, cap 40 is adapted to removably seal the open end of cylindrical cavity 24 and cap 42 is adapted to removably seal the open end of cylindrical cavity 30. Electrical leads 46 and 48 conduct the electrical signals generated by geophones 36 and 38, respectively, to a monitoring and/or recording device, not shown.

Baseplate 10 also has a threaded cylindrical cavity 50 opening on bottom face 18 and extending a short distance upwardly into baseplate 10. Spike 52 has a threaded male element 54 which mates with cavity 50 to removably attach spike 52 to baseplate 10 such that the axis of spike 52 is coincident with plane B. Optionally, a multidirectional level indicator, such as bubble level indicator 56, may be mounted on the top of baseplate 10, or in a cavity, not shown, in the top of the base plate 10, in order to facilitate vertical and lateral alignment of the geophone apparatus during use. Preferably, part or all of baseplate 10 on one side of plane B has some identifying mark, such as paint marking 58, in order to assist the user in identifying the relative positions of geophones 36 and 38 with respect to a selected reference point, such as the sourcepoint being used.

In use, the baseplate apparatus is coupled to the earth by forcing spike 52 a short distance into the earth surface. Baseplate 10 is then adjusted using level indicator 56 such that plane B is vertical and, with the aid of marking 58, baseplate 10 is preferably aligned such that an imaginary horizontal line coincident to plane B, indicated as L, passes through the sourcepoint, not shown. Other alignments of the geophone apparatus may be employed; however, the above-described alignment maximizes the SH components of the output signals generated by geophones 36 and 38. Compressional and shear waves detected by geophones 36 and 38 result in the generation of electrical signals which are transmitted to a recording device, not shown, through electrical conductors 46 and 48, respectively.

The geophones employed must be capable of operation while inclined at a 45° angle from vertical with a minimum of mechanical distortion. The geophones suitable for use in the apparatus of this invention include commercially available vertical geophones, such as the HS-J model vertical geophones marketed by GeoSpace Corporation of Houston, Tex. The baseplate is preferably lightweight and may be made of wood, plastic, any non-ferrous metal, or the like. Other earth coupling means may be used in lieu of spike 52, such as burying the geophone apparatus in a shallow hole or weighing the geophone apparatus down with sand bags or the like. Preferably, the entire apparatus is designed to be streamlined in order to minimize wind-induced interferences in the signals generated by the geophones, for example, the baseplate may be a lightweight hemispherically or elliptically shaped solid.

FIG. 2 illustrates another embodiment of the geophone apparatus of this invention, shown generally as 63, having a hemispherical baseplate 62. Baseplate 62 has smooth circular upper surface 17 with recessed bubble level indicator 56 at the zenith, and preferably identifying alignment mark 58 on one side of a vertical plane, indicated as C, substantially bisecting baseplate 62 and passing through sourcepoint 66. Cylindrical cavities 24 and 30 open through smooth hemispherical upper surface 17, extending downwardly through baseplate 62 along axes 26 and 32, respectively, and terminate at cavity bottoms 28 and 34, respectively. Cylindrical cavities 24 and 30 are positioned such that their respective axes 26 and 32 are each inclined at a 45° angle from vertical on opposite sides of vertical plane C, and are each coincident with a vertical plane, indicated as Q, which bisects baseplate 62 and which is perpendicular to vertical plane C.

Geophones 36 and 38 are coaxially mounted in cylindrical cavities 24 and 30, respectively. Optionally, caps 40 and 42 removably seal the open end of the cylindrical cavities. The flat bottom surface, not shown, of baseplate 62 includes an earth coupling means, not shown, which may be a spike, such as spike 52 in FIG. 1. Electrical conductors 46 and 48, connected to geophones 36 and 38, respectively, protrude from baseplate 62 at or near the bottom of upper surface 17 and preferably at opposite ends of baseplate 62 on plane C and are adapted to conduct the electrical output signals from geophones 36 and 38, respectively, to a monitoring and/or recording device, shown as 64. Any monitoring and/or recording device that is capable of receiving and/or recording electrical output signals from each geophone onto separate channels may be utilized in the method of the invention. Device 64 preferably records the output signals on magnetic tape or the like for subsequent use on a data processing computer.

Referring to FIG. 2, in the method of the invention, seismic source 68, such as a seismic source of the type disclosed in U.S. Pat. No. 4,143,737, positioned at sourcepoint 66 transmits seismic signals containing compressional (P) and vertical shear (SV) wave components as well as horizontal shear (SH) wave components into the subterranean strata, not shown, underlying the earth surface between sourcepoint 66 and geophone apparatus 63. After reflection and/or refraction from various subsurface reflectors, not shown, the returning seismic energy is sensed by geophones 36 and 38. In response to the seismic energy returning from the subterranean strata, each geophone generates an output signal which is proportional to the seismic energy sensed by the geophone. The output signals of geophones 36 and 38 are conducted through electrical conductors 46 and 48, respectively, to separate channels of recording device 64. Subsequently, these output signals from geophones 36 and 38 are summed to form a raw compressional wave trace upon which the compressional wave components of the returning seismic energy are accentuated and the horizontal shear (SH) components are attenuated. Optionally, the output signal of one of geophones 36 and 38 may be subtracted from the output signal of the other geophone to produce a second raw trace upon which the horizontal shear (SH) components are accentuated and the wave components compressional are attenuated. In order to maximize the SH components of the output signals of geophones 36 and 38, geophone apparatus 63 should be aligned such that a line from sourcepoint 66 to apparatus 63 is coincident with vertical plane C.

Detection of compressional and shear wave seismic signals by the novel geophone apparatus in the method of the invention results in the production of a raw trace upon which the desired seismic wave components of the returning energy have an amplitude which is approximately 1.4 times that obtained using a single geophone aligned with the particle motion of the desired seismic wave components.

A seismic profile or a plurality of seismic profiles of subterranean strata being explored may be obtained from seismic traces obtained with a spread of a plurality of geophone apparatus of the invention. The spread may include several geophone apparatus of this invention and/or arrays of such geophone apparatus usually coupled to the earth along one or more parallel lines. Conventional geophone spacing may be employed. Each geophone apparatus within an array in the spread is coupled to the earth, leveled, and aligned in accordance with the invention. The output signals from similarly aligned geophones from the separate geophone apparatus in a geophone array may be summed and then recorded on a single channel for subsequent processing as a composite signal. Such summing serves to attenuate various background noises in the output signals of the individual geophones.

While particular embodiments of the invention have been described, it will be understood, of course, that the invention is not limited thereto since many obvious modifications can be made, and it is intended to include any such modifications as will fall within the scope of the appended claims.

Having now described the invention, I claim:

1. A geophone apparatus capable of detecting both horizontal shear and compressional seismic waves which comprises:
   a baseplate adapted for coupling to the earth; and
   geophones mounted on said baseplate wherein said geophones are present only in one or more pairs such that, when said baseplate is coupled to the earth, the axes of the first and second geophones of each pair are inclined at an angle of about 45° in opposite directions from vertical.

2. The apparatus defined in claim 1 wherein the axes of said geophones are coincident with a common plane traversing said baseplate such that, when said baseplate is coupled to the earth, said plane is vertical.

3. The apparatus defined in claim 1 wherein said axes of said first and second geophones are coincident with first and second planes, respectively, traversing said baseplate such that, when said baseplate is coupled to the earth, said planes are vertical, said first and second planes being parallel to each other.

4. The apparatus defined in claim 1 further comprising multidirectional leveling means mounted on said baseplate for assisting in the leveling of said apparatus when said apparatus is coupled to the earth.

5. The apparatus defined in claim 1 further comprising coupling means attached to said baseplate and adapted for coupling said baseplate to the earth.

6. The apparatus defined in claim 1 further comprising alignment means mounted on said baseplate for indicating a selected alignment of said baseplate with respect to a selected reference point.

7. A geophone apparatus capable of detecting both compressional and horizontal shear waves which comprises:
   a levelable baseplate;
   coupling means attached to said baseplate for coupling said baseplate to the earth;
   multidirectional leveling means mounted on said baseplate for assisting in the leveling of said baseplate when said baseplate is coupled to the earth;
   geophones mounted on said baseplate wherein said geophones are present only in one or more pairs such that the respective primary axes of the first and second geophones of each pair are perpendicular to each other and coincident with a common plane traversing said baseplate and such that, when said baseplate is coupled to the earth, said common plane is vertical and said primary axes are inclined in opposite directions at an angle of 45° from vertical; and
   alignment means mounted on said baseplate for assisting in the alignment of said baseplate with respect to a selected reference point.

8. A geophone apparatus capable of detecting both compressional and horizontal shear waves which comprises:
   a levelable baseplate;
   coupling means attached to said baseplate for coupling said baseplate to the earth;
   multidirectional leveling means mounted on said baseplate for assisting in the leveling of said baseplate when said baseplate is coupled to the earth;
   geophones mounted on said baseplate wherein said geophones are present only in one or more pairs such that the primary axes of the first and second geophones of each pair are coincident with first and second parallel planes, respectively, traversing said baseplate and such that, when said baseplate is coupled to the earth, said planes are vertical and said primary axes are inclined in opposite directions at an angle of about 45° from vertical; and alignment means mounted on said baseplate for assisting in the alignment of said baseplate with respect to a selected reference point.

9. The apparatus defined in claim 1, 7 or 8 wherein said baseplate has a shaped upper surface adapted to minimize wind-induced disturbances of said apparatus while in use.

10. The apparatus defined in claim 1, 7 or 8 wherein said baseplate is hemispherically shaped.

11. The apparatus defined in claim 1, 7 or 8 wherein said baseplate is hemiellipsoidally shaped.

12. The apparatus defined in claim 1, 7 or 8 wherein said baseplate has a polygonal cross-section.

13. The apparatus defined in claim 1, 7 or 8 wherein said coupling means comprises a spike attached to the bottom of said baseplate.

14. The apparatus defined in claim 4, 7 or 8 wherein said multidirectional leveling means comprises a bubble-type level indicator.

15. The apparatus defined in claim 6, 7 or 8 wherein said alignment means comprises an identifying mark on the top of said baseplate which identifies said first geophone.

16. A seismic exploration method comprising:
(a) coupling to the earth at a receiver location, a geophone apparatus having geophones mounted on a common baseplate wherein said geophones are present only in one or more pairs such that, when said baseplate is coupled to the earth, the axes of the first and second geophones of each pair are inclined in opposite directions at an angle of about 45° from vertical;
(b) transmitting a seismic signal from a sourcepoint into subterranean strata between said sourcepoint and said receiver location;
(c) employing said geophone apparatus to sense the seismic energy returning from said subterranean strata to said receiver location, and causing said first and second geophones of each pair to generate first and second output signals, respectively, each of which is proportional to the seismic energy sensed by the respective geophone; and
(d) summing said first and second output signals to form a first raw trace upon which the compressional wave components of said returning seismic energy are accentuated and the horizontal shear wave components are attenuated.

17. The method defined in claim 16 further comprising the step of subtracting said first output signal from said second output signal to form a second raw trace upon which the horizontal shear wave components of said returning seismic energy are accentuated and the compressional wave components are attenuated.

18. The method defined in claim 16 wherein said geophone apparatus is coupled to the earth such that a line from said sourcepoint to said receiver location is substantially normal to a vertical plane or planes containing said axes.

19. A seismic exploration method for concurrently obtaining both compressional and horizontal shear wave profiles of subterranean strata underlying the earth surface between a sourcepoint and a receiver location, which method comprises:
(a) coupling to the earth at said receiver location a geophone apparatus having first and second geophones mounted on a common baseplate such that the axes of said geophones are inclined in opposite directions at an angle of about 45° from vertical, said apparatus being aligned such that a line from said sourcepoint to said receiver location is substantially normal to a vertical plane or planes containing said axes;
(b) transmitting a seismic signal having both compressional and horizontal shear wave components from said sourcepoint into said subterranean strata;
(c) employing said geophone apparatus to sense the seismic energy returning from said subterranean strata to said receiver location and causing said first and second geophones to generate first and second output signals, respectively, each of which is proportional to the seismic energy sensed by the respective geophone;
(d) summing said first and second output signals to form a first raw trace upon which the compressional wave components of said returning seismic energy are accentuated and the horizontal shear wave components are attenuated; and
(e) subtracting said first output signal from said second output signal to form a second raw trace upon which the horizontal shear wave components of said returning seismic energy are accentuated and the compressional wave components are attenuated.

* * * * *